United States Patent
Fang

(10) Patent No.: US 10,019,522 B2
(45) Date of Patent: Jul. 10, 2018

(54) CUSTOMIZED SITE SEARCH DEEP LINKS ON A SERP

(71) Applicant: MICROSOFT CORPORATION, Redmond, WA (US)

(72) Inventor: I-Ting Fang, Redmond, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 563 days.

(21) Appl. No.: 14/485,181

(22) Filed: Sep. 12, 2014

(65) Prior Publication Data

US 2016/0078141 A1     Mar. 17, 2016

(51) Int. Cl.
*G06F 17/00*     (2006.01)
*G06F 17/30*     (2006.01)

(52) U.S. Cl.
CPC .............................. *G06F 17/30867* (2013.01)

(58) Field of Classification Search
CPC ......... G06F 17/30864; G06F 17/30867; G06F 17/2235; G06F 17/3053; G06F 17/30554; G06F 17/30893; G06F 17/3087; G06F 17/30876; G06F 17/30312; G06F 17/30887; G06F 3/04842; G06F 9/54; G06F 17/30029; G06F 17/30253; G06F 17/30598
See application file for complete search history.

(56) References Cited

U.S. PATENT DOCUMENTS

| 6,266,668 | B1 | 7/2001 | Vanderveldt |
| 7,039,684 | B2 | 5/2006 | Blockton |
| 7,647,312 | B2 | 1/2010 | Dai |
| 9,311,168 | B1* | 4/2016 | Lewis ................. G06F 17/3053 |
| 2007/0198741 | A1 | 8/2007 | Duffy |

(Continued)

FOREIGN PATENT DOCUMENTS

CA     2817645 A1     12/2013

OTHER PUBLICATIONS

Frerecks, "Deep Internal Linking Is A Simple SEO Tactic" published Mar. 14, 2008, http://kineticknowledge.com/deep-internal-linking/, 6 pages.

(Continued)

*Primary Examiner* — Yicun Wu
(74) *Attorney, Agent, or Firm* — Shook, Hardy & Bacon L.L.P.

(57) ABSTRACT

Systems, methods, and computer-readable storage media are provided for presenting customized deeplinks on a search engine results page (SERP) to a user via a browser in response to a website name query where the user intends to submit a task-specific query. If selected, the customized deeplink navigates the browser to a webpage of the website that is relevant to the task-specific query. Customized deeplinks are generated by comparing a history associated with the user's browser and the website query database's data. The website query database contains data associated with popular search terms mined from a website server hosting the website. Popular search terms and associated data may be mined from the website's browser log by identifying a search uniform resource locator (URL) pattern from a search form of the website and filtering browser log entries of the browser log that match the identified search URL pattern.

20 Claims, 5 Drawing Sheets

(56) References Cited

U.S. PATENT DOCUMENTS

| | | |
|---|---|---|
| 2011/0289068 A1 | 11/2011 | Teevan |
| 2013/0031079 A1* | 1/2013 | El Daher .......... G06F 17/30554 |
| | | 707/706 |
| 2013/0262427 A1 | 10/2013 | Parsana |
| 2013/0304729 A1 | 11/2013 | Jiang |
| 2015/0215383 A1* | 7/2015 | Sun .................... G06F 17/3089 |
| | | 709/203 |
| 2016/0350422 A1* | 12/2016 | Abrahami ......... G06F 17/30864 |

OTHER PUBLICATIONS

Collado, "Interlinking for WordPress (The Biginners Guide to Better SEO)" published Jun. 10, 2012, http://foamers.net/wordpress-tutorials/interlinking-for-wordpres/, 8 pages.

\* cited by examiner

CUSTOMIZED SITE SEARCH DEEP LINKS ON A SERP

BACKGROUND

In a general sense, search services enable users to locate desired content, such as information or products, from among the vast array of content available via the Internet. Exemplary search services are well known in the art, for instance, a commonly known commercial engine is the BING™ search engine provided by Microsoft Corporation of Redmond, Wash. In response to a search query submitted by the user, the search service presents a number of search results relevant to the search query via a Search Engine Results Page (SERP). The user may then review the search results to determine if one of the search results matches the user's query intent by reviewing the search result descriptors for each search result. Upon determining a search result matching their query intent is present, the user selects a hyperlink on the SERP associated with the appropriate search result descriptor. Selection of the hyperlink navigates the user's browser to a webpage associated with the desired content.

A growing number of search service users conduct searches to complete a specific "task". For example, such users may conduct a search to research a particular topic on a reference website, watch a particular video their friend mentioned on a video-hosting website, purchase a product from an ecommerce website, and the like. Furthermore, the users may wish to search specific websites to complete their task for a variety of reasons, such as the website's popularity or familiarity with the website. However, the first specific website searched may not result in a successful completion of their task. Therefore, several search sessions by the user may be needed before they complete that task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for, among other things, present a SERP including a customized deeplink to a user in response to the user's website name query. A searchable database of website query terms and/or phrases may be created to enable a search service to generate customized deeplinks. The searchable database of website query terms may require identifying a search URL pattern associated with the website, filtering the website's browser log using the identified search URL pattern, and evaluating the filtered browser log to determine information about the activities of users with the website. The customized deeplink may be generated based, at least in part, data associated with the user's browser and/or the website query term data.

BRIEF DESCRIPTION OF THE DRAWINGS

Embodiments of the invention are illustrated by way of example and not limited in the accompanying figures in which like reference numerals indicate similar elements and in which.

DETAILED DESCRIPTION

Figure 1:
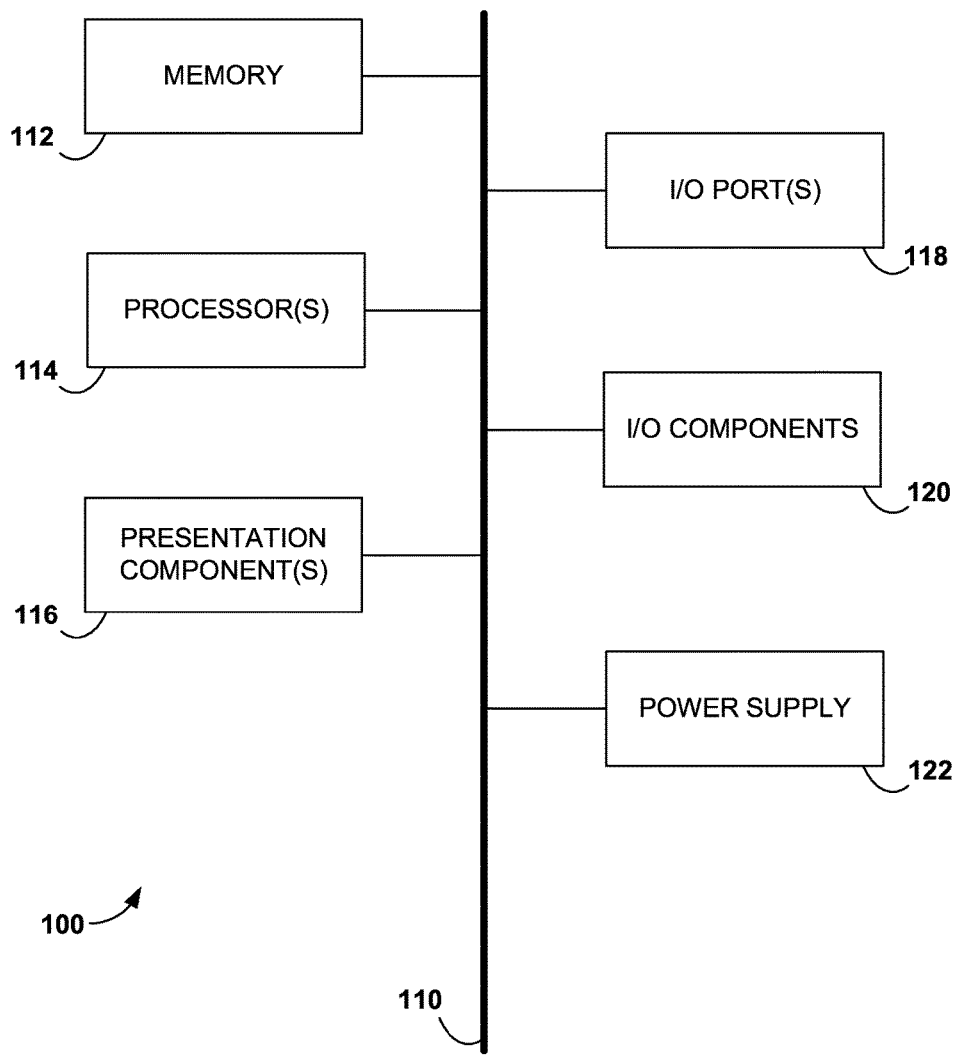
FIG. 1 is a block diagram of an exemplary computing environment suitable for use in implementing embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," or "component," etc., might be used herein to connote different components of methods or systems employed, the terms should not be interpreted as implying any particular order among or between various steps herein disclosed unless and except when the order of individual steps is explicitly described.

Users conducting searches to complete a specific task may partition their current search into two separate search queries: a website name query and a task-specific query. The user may first submit the website name query directly to a search service to reach the specific website without entering the associated Uniform Resource Locator (URL) into their browser. In response to the website name query, the search service returns a SERP comprising a hyperlink directed to a homepage of the specific website.

The user may next select the hyperlink to direct their browser to the URL of a webpage associated with the specific website, such as the website's homepage. Once the user's browser navigates to the webpage, the user may then submit the task-specific query to a query server associated with the specific website. In response to the task-specific query, the specific website's query server may return a query results page comprising one or more search results ("site-specific results"). The site-specific results may correspond to content stored in a content database associated with the specific website ("site-specific content") that may be relevant to the task-specific query. The user may then review the site-specific results to determine if one matches the user's query intent by reviewing their respective search result descriptors.

If none of the site-specific results match the user's query intent, the user consequently would be unable to complete their specific task. As a result, the user may conduct another search session afterwards by submitting another website name query to the search service. This website name query may be directed to another specific website the user wishes to submit their task-specific query in order to complete the specific task. While such users may ultimately complete the specific task, the users may require a significant amount of time to complete their task. Accordingly, search services may improve the user's experience by presenting a customized deeplink that navigates the user's browser to a webpage that may allow them to complete their task.

Conventional SERPs may comprise standard deeplinks that if selected similarly enables the user's browser to directly navigate to specific webpages associated with the website. In contrast to customized deeplinks, standard deeplinks may, for example, be specified in advance of the search query by the website server hosting the website or be populated by webpages associated with hyperlinks found in a navigation menu of the website.

A customized deeplink may be generated in response to a specific user's website name query directed to a specific website using data associated with the user's browser and/or data associated with a website server browser log. Such data may include search queries and/or webpage requests previously directed to that specific website and/or other websites. Upon selection, the customized deeplink may navigate the user's browser to a webpage associated with the specific website relevant to the website name query. The user may then complete their specific task on the webpage associated with the customized deeplink.

Various aspects of the technology described herein are generally directed to systems, methods, and computer-readable storage media for, among other things, presenting customized deeplinks on a SERP to a user in response to a website name query that is directed to a website where the user intends to submit a task-specific query. Embodiments hereof further are directed to generating at least one customized deeplink in response to the website name query based on a comparison of a history associated with the user's browser and popular search terms mined from a website server hosting the website. The popular search terms submitted by a group of users to the website are mined from the website server. Embodiments hereof further are directed to presenting the SERP comprising the at least one customized deeplink to the user. The at least one customized deeplink navigates the browser to a webpage of the website that is relevant to the task-specific query.

Various aspects of the technology described herein are generally employed in computer systems, computer-implemented methods, and computer-readable storage media for, among other things, presenting customized deeplinks on a SERP in response to a website name query submitted by a user. In one embodiment, a website query database is provided containing data associated with popular search terms mined from a website hosted by a website server where the user intends to submit a task-specific query. A search engine coupled to the website query database having one or more processors and one or more computer-readable storage media is also provided. The search engine may receive a website name query directed to the website from the user via a browser. The search engine may also generate at least one customized deeplink in response to the website name query based on a comparison of a history associated with the user's browser and the website query database. Also, the search engine may generate at least one customized deeplink in response to the website name query based on a comparison of a history associated with the user's browser and the website query database. The search engine may present the SERP comprising the at least one customized deeplink to the user that navigates the browser to a webpage of the website that is relevant to the task-specific query.

Another embodiment of the invention is directed to a system comprising one or more computer-readable media having computer-executable instructions thereon that when executed by a computing device perform a method of presenting customized deeplinks on a SERP to a user. The method includes identifying a search URL pattern used by a website from a search form that is adapted to receive search queries submitted by a group of users to the website. The method further includes populating a website query database with data associated with popular search terms submitted by the group of users to the website using the identified search URL pattern. A website name query may be received from the user via a browser directed to the website, wherein the user intends to submit a task-specific query. In response to the website name query, a SERP comprising at least one customized deeplink is presented to the user, wherein the at least one customized deeplink navigates the browser to a webpage of the website that is relevant to the task-specific query.

Exemplary Operating Environment

Having briefly described an overview of embodiments of the invention, an exemplary operating environment in which embodiments of the invention may be implemented is described below to provide a general context for various aspects of these embodiments. Referring to the figures in general and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

The embodiments of the invention may be described in the general context of computer code or machine-useable instructions, including computer-executable instructions such as program components being executed by a computer or other machine, such as a personal data assistant or other handheld device. Generally, program components including routines, programs, applications objects, components, data structures, and the like, refer to code that performs particular tasks or implements particular abstract data types. Embodiments of the invention may be practiced in a variety of system configurations, including handheld devices, tablet computers, consumer electronics, general-purpose computers, specialty computing devices, etc. Embodiments of the invention may also be practiced in distributed computing environments where tasks are performed by remote-processing devices that are linked through a communications network.

As utilized herein, the phrase "computing device" generally refers to a dedicated computing device with processing power and storage memory, which supports operating software that underlies the execution of software, applications, and computer programs thereon. As one skilled in the art will appreciate, computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application specific integrated circuit (ASIC), application-specific standard products (ASSPs), system-on-a-chip (SOC), or complex programmable logic devices (CPLDs).

The hardware logic allows a device to present customized deeplinks on a SERP to a user in response to a website name query that is directed to a website where the user intends to submit a task-specific query. The device may generate the customized deeplinks by comparing history associated with the user's browser and a website query database. The website query database may contain data associated with popular search terms mined from a browser log of a website server hosting the website where the user intends to submit the task-specific query. A browser log analyzer coupled to the website query database may mine the data associated with popular search terms using a search URL pattern identified from a search form used by the website to receive search queries. The search URL pattern may be identified by a search form analyzer coupled to the website query database.

As utilized herein, the phrase "popular search terms" generally refers to words and/or phrases that are frequently entered by users when conducting searches on a website. Accordingly, "popular search terms" may be used synonymously with "frequently used search terms". The frequency of search term use may be determined using data from a particular website's browser log and/or a plurality of website's browser logs. The data from browser logs that may be used for determining popular search terms may include such data as search histories, query-search result interactions, and/or website content click data.

In an embodiment, a search service may identify particular search terms mined from a website's browser log to be "popular search terms" by analyzing a website query database associated with the website. In this embodiment, identifying particular search terms as popular search terms submitted by the website's users may be accomplished by determining whether a popularity threshold is met. For example, the popularity threshold may be met if a particular search term exceeds a specified number of occurrences within the website's browser log. In another example, the popularity threshold may be met if a particular search term exceeds a specified number of occurrences within a specified time period as recorded by the browser log, such as through time stamps. In another example, the popularity threshold may be met if a particular search term exceeds a specified number of occurrences that were submitted by website's users located within a specified geographical range of the user submitting the website name query.

The popularity threshold and any metric associated with the popularity threshold (e.g. the specified number of occurrences, specified time, and/or specified geographical range) may be set by a user via a setting associated with the user's browser, dynamically set by a search service using a machine learning algorithm (MLA), and/or provided as a default by the search service.

In another embodiment, browser log timing data, such as time stamps, may be used by the search service to provide greater weight to more recently submitted search terms than search terms submitted earlier in time when determining popular (frequently used) search terms. Furthermore, popular search terms may be determined for a particular class of websites (e.g. clothing or electronics ecommerce sites) and/or for a particular sub-class of websites (e.g. men's clothing or car electronics ecommerce sites).

With continued reference to FIG. 1, computing device 100 includes a bus 110 that directly or indirectly couples the following devices: memory 112, one or more processors 114, one or more presentation components 116, one or more input/output (I/O) ports 118, one or more I/O components 120, and illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that is accessible by the computing device 100 and includes both volatile and nonvolatile media, removable and nonremovable media. Computer-readable media may comprise both computer storage media and communication media. Computer storage media does not comprise, and in fact explicitly excludes, signals per se.

Computer storage media includes volatile and nonvolatile, removable and nonremovable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired data and that can be accessed by computing device 100. In an embodiment, the computer storage media can be selected from tangible computer storage media like flash memory. These memory technologies can store data momentarily, temporarily, or permanently.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, speaker, printing component, vibrating component, etc.

I/O ports 118 allow the computing device 100 to be logically coupled to other devices including I/O components 120, some of which may be built in. Illustrative I/O components include a microphone, joystick, game pad, satellite dish, scanner, printer, communication component (e.g., network communication component, radio or wireless communications component, or the like), a controller (such as a stylus, keyboard, and mouse) or a natural user interface (NUI), etc. In some instances, inputs may be transmitted to an appropriate network element for further processing.

A NUI processes gestures (e.g., hand, face, body, etc.), voice, or other physiological inputs generated by a user. These inputs may be interpreted as queries, requests for selecting URLs, or requests for interacting with a URL included as a search result. The input of the NUI may be transmitted to the appropriate network elements for further processing. The NUI implements any combination of speech recognition, touch and stylus recognition, facial recognition, biometric recognition, gesture recognition both on screen and adjacent to the screen, air gestures, head and eye tracking, and touch recognition associated with displays on computing device 100. Computing device 100 may be equipped with depth cameras, such as stereoscopic camera systems, infrared camera systems, RGB camera systems, and combinations of these, for gesture detection and recognition. Additionally, computing device 100 may be equipped with accelerometers or gyroscopes that enable detection of motion. The output of the accelerometers or gyroscopes is provided to the display of computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein also may be practiced in distributed computing environments where tasks are performed by remote processing devices that are linked through a communications network. In a distributed computing environment, program modules may be located in both local and remote computer storage media including memory storage devices.

Furthermore, although the term "search service" is used herein, it will be recognized that this term may also encompass a server, a Web browser, a set of one or more processes distributed on one or more computers, one or more stand-alone storage devices, a set of one or more other computing or storage devices, a combination of one or more of the above, and the like.

As previously mentioned, embodiments of the invention are generally directed to systems, methods, and computer-readable storage media for, among other things, presenting a SERP display including customized deeplinks in response to a website name query submitted by a user. The customized deeplinks may be generated based on an evaluation of data extracted from a client device's log and/or a website server's browser log. The customized deeplinks, if selected, may navigate the user's browser directly to a specific webpage associated with a website that is relevant to the website name query. The specific webpage may contain content that is relevant to prior search queries and/or webpage requests.

Exemplary Network Environment

Figure 2:
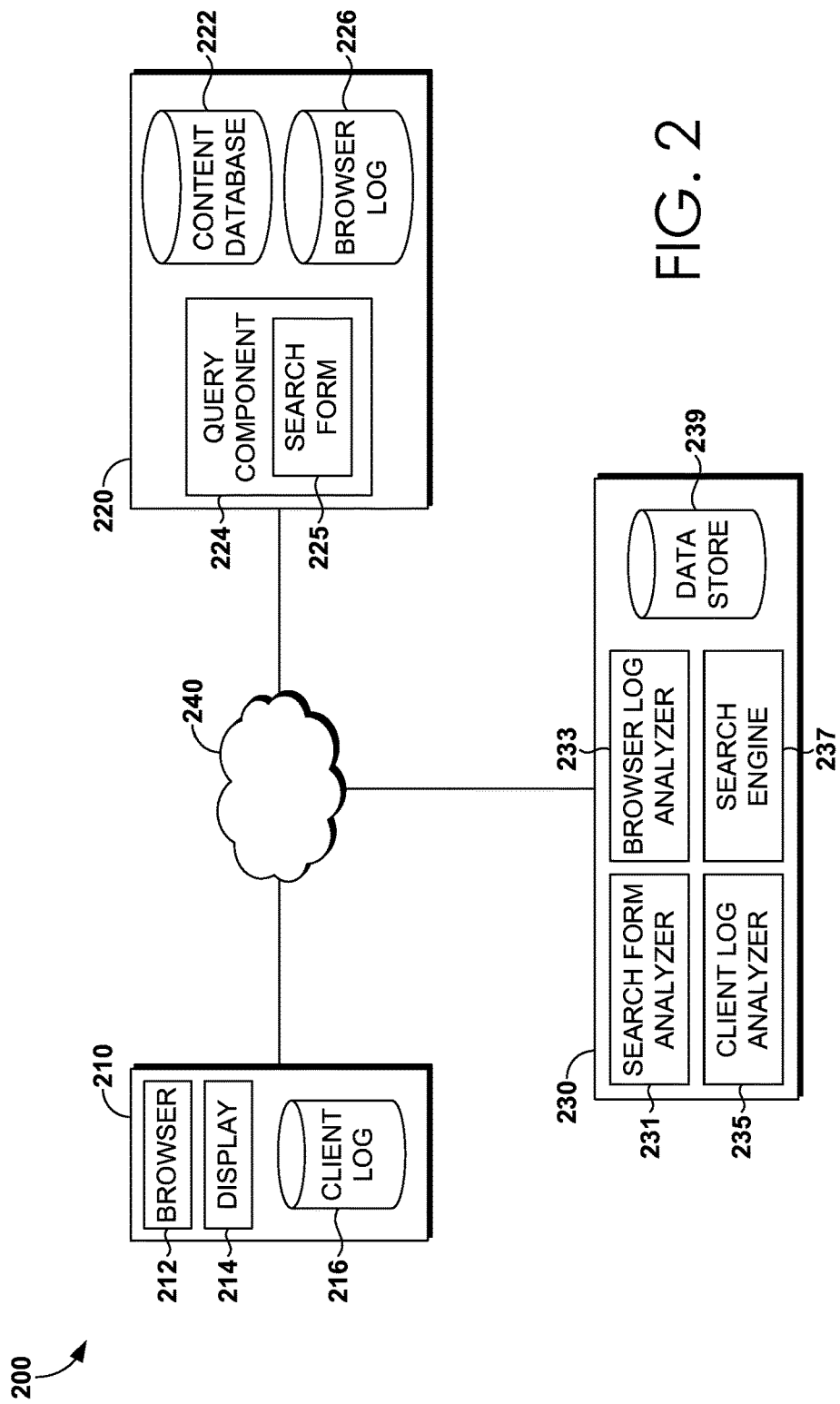
FIG. 2 is a block diagram of an exemplary computing system suitable for use in implementing embodiments of the invention.

Referring now to FIG. 2, a block diagram is provided illustrating an exemplary computing system 200 in which embodiments of the invention may be employed. Generally, computing system 200 is configured to infer a user's specific task upon receipt of a website name query from the user. Computing system 200 may leverage the user's recent search data and/or a website server's browser log to infer the user's specific task. In response to the website name query, computing system 200 may present customized deeplinks to the user via a SERP using the inferred user specific task. The customized deeplinks may permit the user to navigate their browser to a webpage of a specific website that may be relevant to the website name query. The webpage associated with the customized deeplink may contain site-specific content that enables the user to complete the specific task that motivated the user to conduct the search. Accordingly, computing system 200 may allow such users to complete their intended tasks more efficiently, and thereby reduce the user's task completion time.

Search results, as used herein, refer to content and/or links to content that are determined to satisfy (or at least substantially satisfy) a search query. Often, presented search results are approximations of satisfying results rather than exact result matches, such as when an insufficient number of satisfying search results is available. Those of skill in the art will understand that search results differ from query completion suggestions not only in content (although in some instances the content may be substantially similar), but also in their use upon user selection thereof.

Among other components not shown, computing system 200 generally comprises client device 210, website server 220, search service 230, and network 240. Network 240 may communicatively connect client device 210, website server 220, and search service 230. It should be understood that any number of client computing devices, search services, and website servers may be employed in computing system 200 within the scope of embodiments of the invention. Each may comprise a single device/interface or multiple devices/interfaces cooperating in a distributed environment. For instance, search service 230 may comprise multiple devices and/or modules arranged in a distributed environment that collectively provide the functionality of search service 230 described herein. Additionally, other components/modules not shown also may be included within computing system 200.

In some embodiments, one or more of the illustrated components/modules may be implemented as stand-alone applications. In other embodiments, one or more of the illustrated components/modules may be implemented via client device 210, as an Internet-based service, or as a module inside search service 230. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or client computing devices. By way of example only, search service 230 may be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 2, client device 210 may any type of computing device that enables a user to communicate a search query, such as a website name query, to a search service (e.g. computing device 100 of FIG. 1). Generally, client device 210 includes browser 212, display 214, and client log 216. Any of the components of client device 210 may be implemented alone or in combination to communicate with search service 230 to provide the user with one or more search results in response to the search query.

Browser 212, among other things, may be configured to communicate with and/or transfer content between other computing devices coupled to client device 210 either locally or via network 240. Such content may include search engine home pages, web pages associated with a specific website, SERPs, and any other form of computing file. Browser 212 may be any suitable type of web browser such as INTERNET EXPLORER™, provided by Microsoft Corporation of Redmond, Wash., or other type of software configured to enable submission of search queries as described herein. It should be noted that embodiments of the present invention are equally applicable to mobile computing devices and devices accepting touch and/or voice input. Any and all such variations, and any combination thereof, are contemplated to be within the scope of embodiments of the present invention.

Browser 212 may also be configured to receive inputs from a user to facilitate such communication and/or content transfers. For example, browser 212 may receive inputs from users conducting searches to complete a task via an input device in communication with client device 210. Users may conduct searches by entering a search query into a designated search query input region of the user interface via an input device (not shown) in communication with client device 210. The input device may include a mouse, joystick, key pad, microphone, I/O components 120 of FIG. 1, or any other component capable of receiving a user input and communicating an indication of that input to client device 210. The input device may facilitate entry of a search query and/or may control the location of a selection tool (e.g., mouse pointer) hovering over search results presented on display 214 that are responsive to the search query.

Display 214 may be configured to present content to the user, rendered by browser 212, which is received from other computing devices. For example, display 214 may present various content including, without limitation, SERPs having results indexed within a particular vertical information domain rather than merely within the general web search domain as described herein. Display 214 may be operably coupled to an output of client device 210, may be configured as any presentation component that is capable of presenting content to a user, such as a digital monitor, electronic display panel, touch-screen, analog set-top box, plasma screen, audio speakers, Braille pad, and the like. In embodiments, display 214 is further configured to enable touch inputs from a user or provide a NUI. In another exemplary embodiment, the presentation device is capable of rendering other forms of media (e.g., audio signals).

Client log 216 may be configured to store the user's browser history locally on client device 210. The user's browser history stored in client log 216 may include, among other things, searches performed via browser 212, information related to user interactions with search results received via browser 212, and corresponding navigations to content identified by the search results. For example, client log 216 may be configured to record user clicks on search results received via browser 212 to improve future search results. When authorized by the user, client device 210 may share the user's browser history stored in client log 216 with search service 230.

Website server 220 may be configured to host a website comprising a plurality of related webpages that are accessible by client devices (e.g. client device 210) via network 240. Webpages are computer files comprising text, content, and Hyper Text Markup Language (HTML) tags that direct how a browser (e.g. browser 212) renders the webpage for presentation on a display. One of the website's webpages may be a home page (or front page) that informs users of the website's purpose and provides hyperlinks that navigate the user's browser to other webpages of the website. The website home page may also facilitate entry of a search query (e.g. a task-specific query) from users directed to content stored in content database 222 via a search form 225. Query component 224 may function similar to a search engine with respect to content database 222 by receiving the user's search query directed to the website's content. In response to the search query, query component 224 may return search results that identify specific website content that is relevant to the search query. Website server 220 may use browser log 226 to maintain a history of server activities, for instance, user activities with the website hosted by website server 220. The history may include an internet protocol (IP) address of a computing device submitting a search query, information about a referring webpage that directed the computing device to the website (e.g. a URL), a date/time stamp of the activity, demographic information, and the like. Although illustrated as a single, independent component, browser log 226 may, in fact, be a plurality of log files, such as an access log file, an error log file, and a referrer log file.

Search service 230 may communicate with client device 210 and website server 220 to facilitate a user's search for content by presenting a SERP with customized deeplinks for display by client device 210. Search service 230 may implement any combination of the following components to perform these functions: search form analyzer 231, browser log analyzer 233, client log analyzer 235, search engine 237, and data store 239.

Search form analyzer 231 may be configured to retrieve a search form used by a website server (e.g. search form 225 of website server 220) and/or a proxy server (not shown) associated with the website server. The search form may then be evaluated by search form analyzer 231 to identify a search URL pattern used by a query component associated with the website server (e.g. query component 224). For example, a search URL pattern used by the BING™ search engine is "http://www.bing.com/search?q=searchterm". Search form analyzer 231 may then forward the identified search URL pattern to data store 239.

Browser log analyzer 233 may be configured to receive a browser log (e.g. browser log 226) from a website server containing a history of server activities, for instance, user activities with the website. Using the identified search URL pattern associated with the website server, browser log analyzer 233 may identify browser log entries reflecting search queries submitted by users to the website. Browser log analyzer 233 may evaluate the identified browser log entries to generate information about user interactions with the website. For example, browser log analyzer 233 may identify popular search terms submitted by users to the website's query component based on how frequently search terms appear in the browser log. Browser log analyzer 233 may identify particular search terms to be popular search terms by determining whether a particular search term appearing in the browser log meets a popularity threshold. As discussed above, various metrics may be used by browser log analyzer 233 in determining whether the popularity threshold is met. For example, a specific number of occurrences in the browser log, a specific number of occurrences within a specific time period, and/or a specified number of occurrences that were submitted by website users located within a specified geographical range of the user submitting the website name query. Accordingly, popular search terms may be further evaluated to index them based on such things a time/date of the search query, geographic location of the client device submitting the search query, click-through rates of the search results returned, or any information relating to a user's interaction with the website. Browser log analyzer 233 may store the information extracted from the browser log in data store 239 as a website query database associated with the website.

Client log analyzer 235 may be configured to retrieve a client log (e.g. client log 216) from a client device if search service 230 has received a user's consent via a consent mechanism. The client log may be evaluated by client log analyzer 235 to generate information about previous search sessions conducted using a browser associated with the client device. In an embodiment, client log analyzer 235 may identify search queries submitted by the browser to a website. For example, client log analyzer 235 may identify search queries submitted to query component 224 of website server 220. Client log analyzer 235 may also identify search terms that appear frequently in the client log without regard to where the search query was submitted. In another embodiment, search queries in the client log may be further evaluated to index them based on such things a time/date of the search query, click-through rates of the search results returned, or any other information relating to a user's interaction with any website. Client log analyzer 235 may forward client query data with no information specific to the user to data store 239 for use in improving future query completion suggestions and/or search results.

Search engine 227 may be configured to receive a search query from client device 210, and return ranked search results to client device 210 identifying content in the web domain relevant to the search query. Search engine 227 may also operate as a conventional search engine by crawling content from the web domain and indexing web domain content.

Data store 239 may be configured to store information pertaining to search queries, search results, and data points associated therewith. In various embodiments, such information may include, without limitation, search query logs, search result identifying algorithms, website query database, client query data, and the like. In embodiments, data store 239 may be configured to be searchable for one or more of the items stored in association therewith. It will be understood and appreciated by those of ordinary skill in the art that the information stored in association with data store 239 may be configurable and may include any information relevant to search queries, search results, and data points associated therewith. The content and volume of such information are not intended to limit the scope of embodiments of the present invention in any way. Further, though illustrated as a single, independent component, data store 239 may, in fact, be a plurality of storage devices, for instance a database cluster, portions of which may reside in association with the search service 230, another external computing device (not shown), and/or any combination thereof.

Network 240 may be configured to communicatively couple the client device 210 and the search service 220. Network 240 may include any number of networks such as, for example, a local area network (LAN), a wide area network (WAN), the Internet, a cellular network, a peer-to-peer (P2P) network, a mobile network, or a combination of networks. Such networking environments are commonplace in offices, enterprise-wide computer networks, intranets and the Internet. Accordingly, network 214 is not further described herein. Such networking environments are commonplace in offices, enterprise-wide computer networks, intranets and the Internet.

Figure 3:
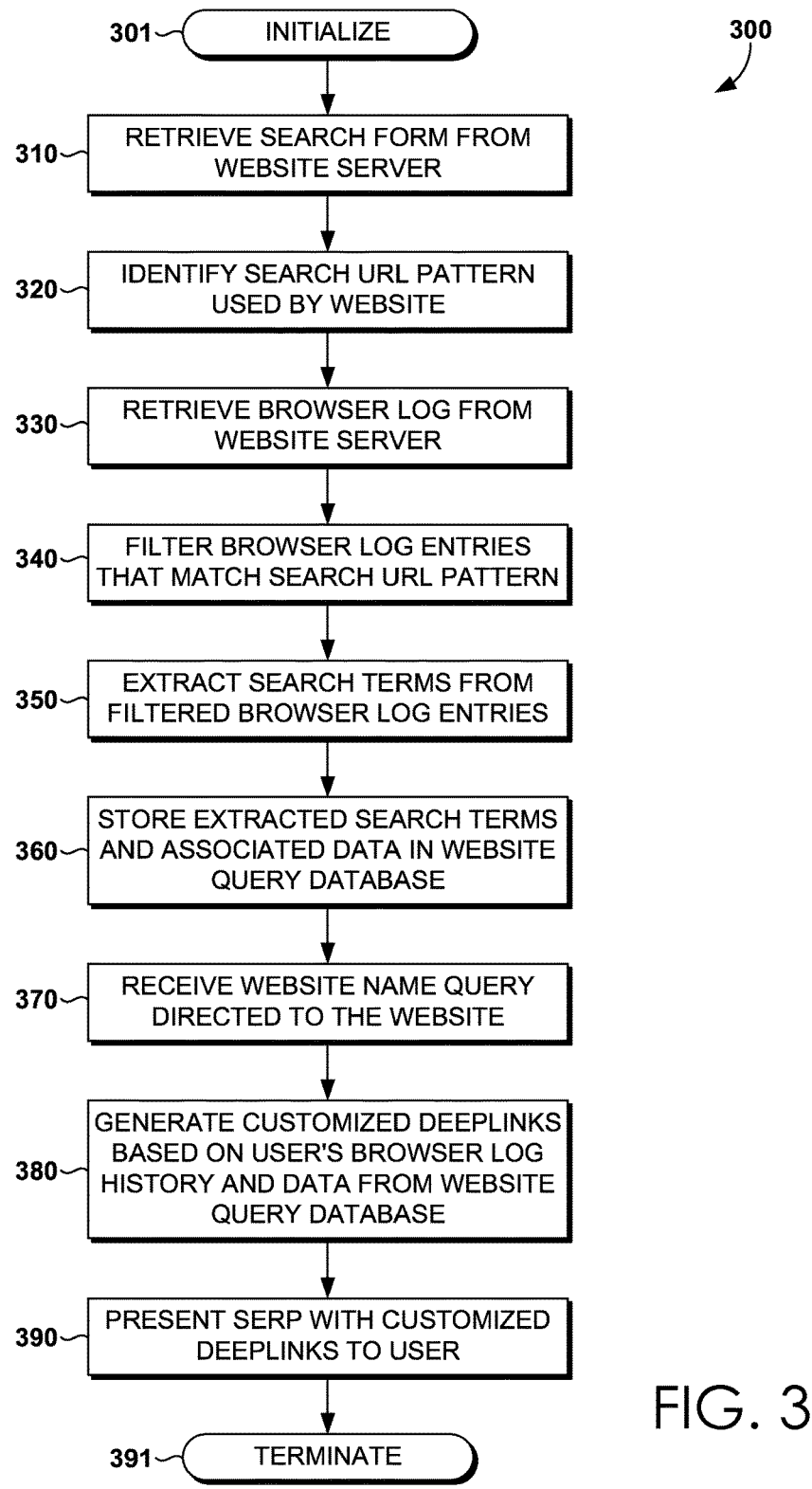
FIG. 3 illustrates a logic diagram of a method for providing customized deeplinks on a SERP.

Turning now to FIG. 3, a logic diagram for a method 300 of providing customized deeplinks on a SERP is illustrated. Method 300 initializes in step 301. In step 310, a search form analyzer associated with a search service may retrieve a search form from a website server. For example, search form analyzer 231 may retrieve search form 225 used by website server 220 to receive search queries directed to content stored in content database 222. In step 320, the search form analyzer may evaluate the search form to identify a search URL pattern used by the website server for querying content stored in its content database. Once identified, the search URL pattern and data associating it with the website may be stored in a data store operably coupled to the search service.

In step 330, a browser log analyzer associated with the search service may receive a browser log from the website server. For example, browser log analyzer 233 may receive browser log 226 used by website server 220 to maintain a history of server activities. For instance, server activities may include user activities with a website hosted by the website server, such as search queries and webpage requests. In step 340, the browser log analyzer may evaluate the raw browser log to filter all browser log entries that match the search URL pattern identified by the search form analyzer. In step 350, the browser log analyzer extracts all query terms embedded in the filtered browser log entries. The extracted query terms are evaluated to determine statistical data about them (e.g. popularity of specific query terms and/or phrases, timing of the search query submissions, aggregate data about users submitting the search queries, and the like). In an embodiment, particular search terms may be identified as popular query terms if a popularity threshold is met as discussed above relative to browser log analyzer 233 of FIG. 2. In another embodiment, the aggregate data about users submitting the search queries includes geographic locations, average click through rates, average number of search results viewed, and the like. In step 360, the browser log analyzer may store data about the extracted query terms from the filtered browser log, such as statistical data, in the data store as website query database.

In step 370, a search engine associated with the search service may receive a website name query from the client device directed to a website hosted by the website server. For example, search engine 235 may receive a website name query directed to a website hosted by website server 220. In response, the search engine may generate one or more customized deeplinks based on a comparison of a history associated with the user's browser and the popular search terms mined from the website server from the website query database associated with the website, in step 380. In step 390, the search engine presents a plurality of search results on a SERP to the user in response to the website name query. The SERP may comprise a hyperlink directed to the website hosted by the website server and one or more customized deeplinks. The method terminates in step 391.

Figure 4:
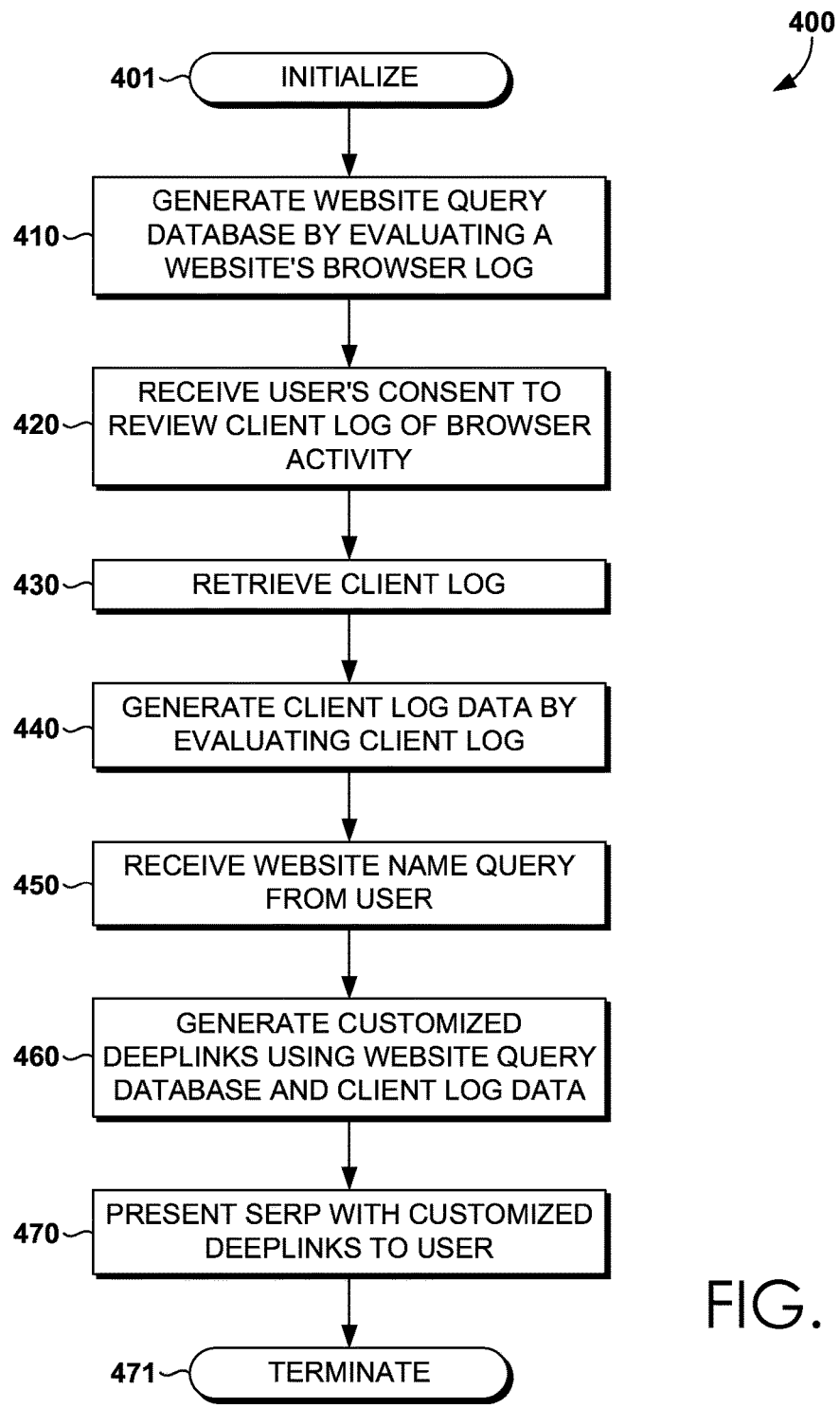
FIG. 4 illustrates a logic diagram of another method for providing customized deeplinks on a SERP.

FIG. 4 illustrates another embodiment of a logic diagram for a method 400 of providing customized deeplinks on a SERP. Method 400 initializes in step 401. In step 410, a browser log analyzer associated with a search service may evaluate a browser log associated with a website server to generate a website query database. In an embodiment, the browser log analyzer in step 410 may function substantially similar to the browser log analyzer in steps 330-360 of FIG. 3. The extracted query terms are evaluated to determine statistical data about them (e.g. popularity of specific query terms and/or phrases, timing of the search query submissions, aggregate data about users submitting the search queries, and the like). In an embodiment, particular search terms may be identified as popular query terms if a popularity threshold is met as discussed above relative to browser log analyzer 233 of FIG. 2. In an embodiment, the aggregate data about users submitting the search queries includes geographic locations, average click through rates, average number of search results viewed, and the like. The browser log analyzer may store the website query database associated with the website in a data store operably coupled to the search service.

In step 420, the search service may receive a user's consent to evaluate a search history log comprising information about the user's previous search sessions via a consent mechanism. For example, search service 230 may receive consent from a user of client device 210 to evaluate client log 216 via a consent mechanism. In step 430, a client log analyzer associated with the search service may retrieve a client log associated with the client device. For example, client log analyzer 235 may retrieve client log 216 that captures client device activity with respect to browser 212. In step 440, the client log analyzer may evaluate the client log to generate client log data including the search queries and webpage requests. The client log data may be further analyzed to index the data based on such things a time/date of the search query, click-through rates of the search results returned, or any other information relating to a user's interaction with any website.

In step 450, a search engine associated with the search service may receive a website name query from the client device directed to a website hosted by the website server. For example, search engine 237 may receive a website name query directed to a website hosted by website server 220. In response, the search engine may identify client log data and/or website query database data that is relevant to the website name query to generate one or more customized deeplinks, in step 460. In step 470, the search engine presents a plurality of search results on a SERP to the user in response to the website name query. The SERP may comprise a hyperlink directed to the website hosted by the website server and one or more customized deeplinks. The method terminates in step 471.

Figure 5:
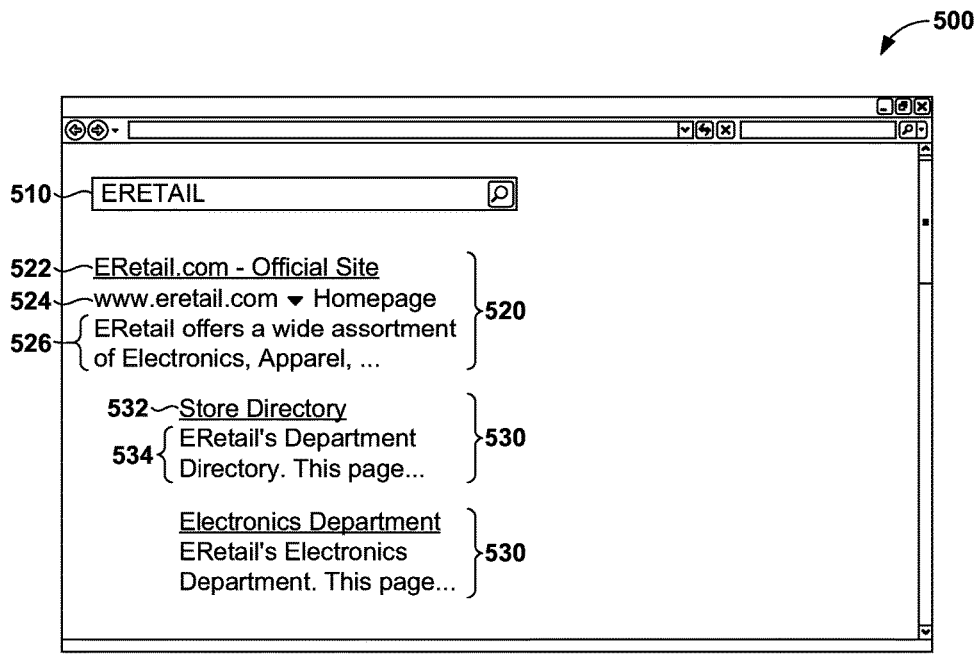
FIG. 5 is an embodiment of a screen shot showing an exemplary SERP display without customized deeplinks.

FIG. 5 is an embodiment of a screen shot showing an exemplary SERP display 500 without customized deeplinks. As discussed above, a search service (e.g. search service 230 of FIG. 2) may present search results on SERP display in response to a website name query received from a client device. In an embodiment, SERP display 500 may be presented on any type of display associated with a client device (e.g. display 214 of FIG. 2). In the embodiment depicted in FIG. 5, a user conducting a search to complete the task of purchasing a new pair of women's shoes submits a website name query to a search service (e.g. search service 230 of FIG. 2). The user may have unsuccessfully searched for women's shoes on several other e-commerce retailer websites prior to submitting this website name search.

In response to the website name query, the search service presents SERP display 500 to the user comprising search bar 510, search result 520, and standard deeplink 530. As shown in search bar 510, the website name query in this embodiment is directed to the user's favorite e-commerce retailer "ERetailer.com". The search service determined the ERetailer.com website was relevant to the user's website name query, and consequently presents it to the user as search result 520. Search result 520 may comprise search result title hyperlink 522, search result URL 524, and search result snippet 526. Search result snippet 526 may provide the user with a brief synopsis of the ERetailer.com webpage the user's browser would be navigated to if search result title hyperlink 522 is selected.

SERP display 500 may also present the user with standard deeplinks 530 immediately below search result 520. As discussed above, standard deeplinks may be specified in advance of the search query by the website server hosting the website or represent additional search results from the same website. Standard deeplink 530 may also include a standard title hyperlink 532 and standard deeplink snippet 534 that provides the user with a brief synopsis of standard deeplink 530. As shown by SERP display 500, the user must still navigate their browser to the website (e.g. ERetailer.com) and submit a task-specific query in order to complete their task of purchasing women's shoes.

Figure 6:
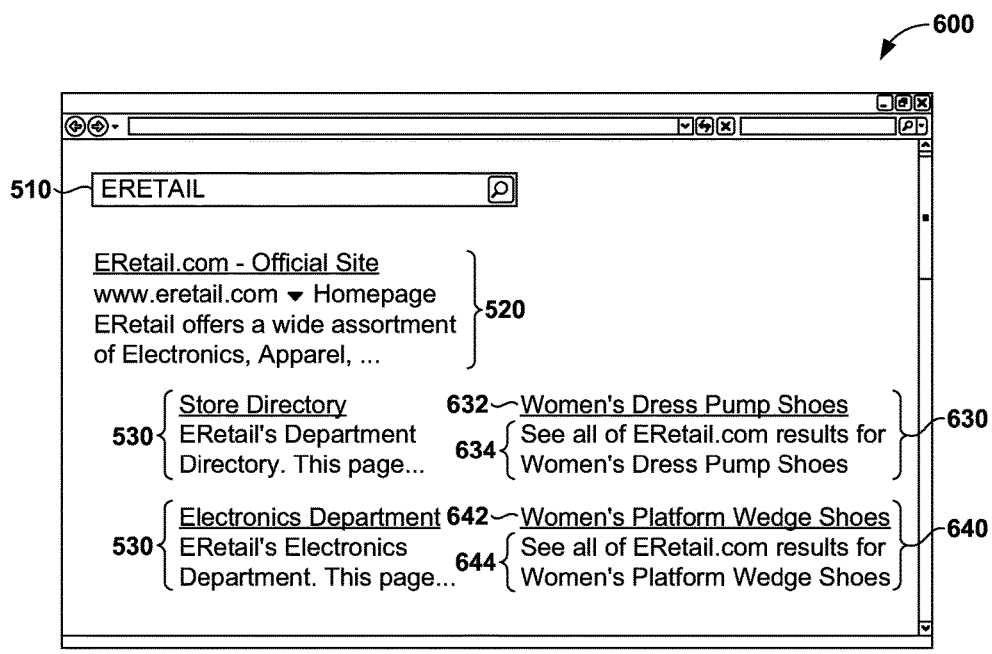
FIG. 6 is an embodiment of a screen shot similar to FIG. 5 showing an exemplary SERP display with customized deeplinks.

FIG. 6 is an embodiment of a screen shot similar to FIG. 5 showing an exemplary SERP display 600 with customized deeplinks. A user viewing a conventional SERP display (e.g. SERP display 500) would still need to submit a task-specific query to complete the task motivating their search session. As described above, a search service may use a website query database and/or client log data to provide customized deeplinks. Such customized deeplinks of SERP display 600 may shorten a user's task completion time like the user executing the website name query in the FIG. 5 example.

In response to the website name query in the FIG. 5 example, the search server may present SERP display 600 to the user. SERP display 600 may comprise search bar 610, search result 620, and standard deeplink 630, which may be substantially similar to search bar 510, search result 520, and standard deeplink 530, respectively. SERP 600 may also comprise two customized deeplinks: first custom deeplink 630 and second custom deeplink 640. Each customized deeplink may comprise a custom title hyperlink and a custom snippet that provides the user with a brief synopsis of the customized deeplink.

The search service may present first custom deeplink 630 using client log data associated with the client device and/or the website query database associated with the ERetailer.com website's browser log. If selected, first custom title hyperlink 632 may navigate the user's browser to a webpage of the ERetailer.com website with content about women's dress pump shoes, as described by first custom snippet 634. The search service may have determined from client log data associated with client device that the user has recently submitted numerous search queries and/or webpage requests directed to women's shoes. The search service may then evaluate the website query database associated with the ERetailer.com website. Based upon the evaluation of the website query database, the search service may have determined that dress pump was a popular search query phrase received by the website that is relevant to women's shoes.

The search service may also present second customized deeplink 640 using client log data associated with the client device and/or the website query database associated with the ERetailer.com website's browser log. If selected, second custom title hyperlink 642 may navigate the user's browser to a webpage with content about women's platform wedge shoes, as described by second custom snippet 644. The search service may have refined its evaluation of the website query database associated with the ERetailer.com website to only users submitting search queries that are located within a certain range of the user. Based upon the refined evaluation of the website query database, the determination was made that platform wedge was a popular search query phrase submitted by users within that range of the user that is relevant to women's shoes.

FIG. 6 is presented as an example only, and many different configurations in accordance with alternative embodiments of the invention are available for providing customized site search deeplinks on a SERP. The depiction in FIG. 6 is not intended to be a definitive example or a preferred embodiment, and accordingly should not be interpreted as having any dependency or requirement relating to any one or combination of components/modules illustrated. For example, a search service may present customized deeplinks based on client log data that is limited to query terms and/or phrases recently submitted by the client device to the specific website. In another embodiment, customized deeplinks may be presented based on client log data that is limited to query terms and/or phrases submitted by the client device to a website hosted by a different website server. Therefore, customized deeplinks may be presented based on any combination of data contained in the client log data and/or the website query database.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the figures and described above are not meant to limit the scope of the embodiments of the invention in any way and, in fact, the steps may occur in a variety of different sequences within embodiments hereof. Any and all such variations, and any combination thereof, are contemplated to be within the scope of embodiments of the invention.

What is claimed is:

1. One or more computer-storage media devices having computer-executable instructions thereon that when executed by a computing device perform a method of presenting customized deeplinks on a search engine results page (SERP) to a user, the method comprising:
    mining, from a website server hosting a website, popular search terms submitted by a group of users to the website, wherein mining popular search terms comprises,
        retrieving a search form from the website server;
        evaluating the search form to identify a search uniform resource locator (URL) pattern, the search URL pattern used by the website server for querying content stored in association with the website server;
        retrieving a log from the website server, the log having log entries, wherein the log entries comprise a history of activity associated with the website server;
        filtering the log entries for entries that match the search URL patterns; and
        extracting the filtered log entries and determining popular search terms from the filtered log entries;
    receiving a website name query from the user, wherein the website name query is directed to the website where the user intends to submit a task-specific query;
    generating at least one customized deeplink in response to the website name query based on an analysis of a history of issued search queries associated with the user and the popular search terms mined from the website server; and
    presenting the SERP comprising the at least one customized deeplink to the user, wherein the at least one customized deeplink navigates to a webpage of the website that is relevant to the task-specific query.

2. The media devices of claim 1, wherein the method further comprises generating a website query database from data associated with the popular search terms mined from the website.

3. The media devices of claim 2, wherein the website query database data includes any combination of the following: a timestamp that identifies when particular search terms were submitted to the website, SERPs presented in response to particular search terms, location data that identifies where particular search terms were submitted, or one or more previous URLs interacted with based on SERPs presented in response to particular search terms.

4. The media devices of claim 2, wherein the method further comprises augmenting the website query database with data from the history associated with the user if consented to by the user.

5. The media devices of claim 1, wherein the history associated with the user includes any combination of the following: SERPs of previous queries presented to the user or one or more previous URLs interacted with by the user.

6. The media devices of claim 1, wherein the method further comprises generating at least one additional customized deeplink in response to the website name query based on a comparison of the history associated with the user and a subset of popular search terms mined from the website server, and wherein the at least one additional customized deeplink navigates to a webpage of the website that is relevant to the task-specific query.

7. The media devices of claim 6, wherein the subset of popular search terms are identified by any combination of the following factors: distance from the user of a particular search term submission, time of the particular search term submission in reference to the website name query, or click-through rate of SERPs presented in response to particular search terms.

8. The media devices of claim 1, wherein the method further comprises generating a custom snippet that provides the user with a brief synopsis of the at least one customized deeplink.

9. A computing system for presenting customized deeplinks on a search engine results page (SERP) in response to a website name query submitted by a user, the system comprising:
    a processor and a memory configured for providing computer program instructions to the processor; and
    a website query database containing popular search terms associated with a website hosted by a website server where the user intends to submit a task-specific query, wherein the popular search terms are determined based on mined statistical data from the website, the mined statistical data associated with an aggregate of users of the website; and a search engine coupled to the website query database having one or more processors and one or more computer-readable storage media, wherein the search engine is adapted to:
receive a website name query from the user, wherein the website name query is directed to the website;
generate at least one customized deeplink in response to the website name query based on a comparison of a history of issued search queries associated with the user and the website query database; and
present the SERP comprising the at least one customized deeplink to the user, wherein the at least one customized deeplink navigates to a webpage of the website that is relevant to the task-specific query.

10. The computing system of claim 9, wherein the website query database is generated by a log analyzer having one or more processors and one or more computer-readable storage media, wherein the log analyzer is coupled to the search engine and adapted to:
filter log entries of a log associated with the website server using an identified search uniform resource locator (URL) pattern employed by the website; and
mine the filtered log entries to generate data associated with the popular search terms submitted to the website.

11. The computing system of claim 10, wherein the search URL pattern is identified by a search form analyzer having one or more processors and computer-readable storage media, wherein the search form analyzer is coupled to the search engine and adapted to identify the search URL pattern by evaluating a search form used by the website to receive search queries submitted by a group of users to the website.

12. The computing system of claim 9, wherein the website query database's data includes any combination of the following: a timestamp that identifies when particular search terms were submitted to the website, SERPs presented in response to particular search terms, location data that identifies where particular search terms were submitted, or one or more previous URLs interacted with based on SERPs presented in response to particular search terms.

13. The computing system of claim 9, wherein the history associated with the user includes any combination of the following: SERPs of previous queries presented to the user or one or more previous URLs interacted with by the user.

14. The computing system of claim 9, wherein the search engine is further adapted to generate at least one additional customized deeplink in response to the website name query based on a comparison of the history associated with the user and a subset of popular search terms mined from the website server, and wherein the at least one additional customized deeplink navigates the browser to a webpage of the website that is relevant to the task-specific query.

15. One or more computer-storage media devices having computer-executable instructions thereon that when executed by a computing device perform a method of presenting customized deeplinks on a search engine results page (SERP) to a user, the method comprising:
identifying a search uniform resource locator (URL) pattern used by a website from a search form that is adapted to receive search queries submitted by a group of users to the website;
generating one or more popular search terms from the search queries submitted by the group of users to the website by determining whether a particular search exceeds a predetermined popularity threshold;
populating a website query database with data associated with the one or more popular search terms submitted by the group of users to the website using the identified search URL pattern;
receiving a website name query from the user directed to the website, wherein the user intends to submit a task-specific query; and
presenting a SERP comprising at least one customized deeplink in response to the website name query received from the user and the one or more search popular search terms, wherein the at least one customized deeplink navigates to a webpage of the website that is relevant to the task-specific query, and wherein the at least one customized deeplink is generated based on at least one or more queries issued by the user within a predetermined period of time of receiving the website name query.

16. The media devices of claim 15, wherein the at least one customized deeplink is generated through a comparison of a history associated with the user and the website query database's data.

17. The media devices of claim 16, wherein the history associated with the user includes any combination of the following: SERPs of previous queries presented to the user or one or more previous URLs interacted with by the user.

18. The media devices of claim 15, wherein the website query database's data includes any combination of the following: a timestamp that identifies when particular search terms were submitted to the website, SERPs presented in response to particular search terms, location data that identifies where particular search terms were submitted, or one or more previous URLs interacted with based on SERPs presented in response to particular search terms.

19. The media devices of claim 15, wherein the predetermined popularity threshold is associated with a geographic region.

20. The media devices of claim 15, wherein the popularity threshold is dynamically predetermined using a machine learning algorithm.

* * * * *